US012567813B2

(12) United States Patent
Li et al.

(10) Patent No.: US 12,567,813 B2
(45) Date of Patent: Mar. 3, 2026

(54) METHOD OF POWER FACTOR CORRECTION BURST MODE LOAD MEASUREMENT AND CONTROL

(71) Applicant: Vitesco Technologies USA, LLC, Auburn Hills, MI (US)

(72) Inventors: Michael J Li, Troy, MI (US); Mikhail Zarkhin, West Bloomfield, MI (US)

(73) Assignee: Vitesco Technologies GmbH, Regensburg (DE)

( * ) Notice: Subject to any disclaimer, the term of this patent is extended or adjusted under 35 U.S.C. 154(b) by 139 days.

(21) Appl. No.: 18/049,749

(22) Filed: Oct. 26, 2022

(65) Prior Publication Data

US 2023/0118346 A1      Apr. 20, 2023

Related U.S. Application Data

(60) Provisional application No. 63/293,133, filed on Dec. 23, 2021.

(51) Int. Cl.
H02M 1/00       (2007.01)
H02M 1/42       (2007.01)
H02M 7/217      (2006.01)

(52) U.S. Cl.
CPC .........  H02M 7/217 (2013.01); H02M 1/0035 (2021.05); H02M 1/4225 (2013.01); H02M 1/4258 (2013.01)

(58) Field of Classification Search
CPC ............. H02M 1/4225; H02M 1/4258; H02M 1/0035; H02M 7/217; H02M 1/0003;

H02M 1/0009; H02M 1/42; H02M 7/21; H02M 7/219; H02M 3/156; H02M 3/158; H02M 3/335; H02M 3/33507
See application file for complete search history.

(56) References Cited

U.S. PATENT DOCUMENTS

| | | | |
|---|---|---|---|
| 7,990,740 B1 | 8/2011 | Notohamiprodjo | |
| 10,389,233 B1 * | 8/2019 | Lim .................... | H02M 1/4225 |
| 11,522,442 B1 * | 12/2022 | Li ........................ | H02M 1/0032 |
| 2011/0018507 A1 | 1/2011 | McCloy-Stevens | |

(Continued)

FOREIGN PATENT DOCUMENTS

| | | |
|---|---|---|
| DE | 3918767 A1 | 12/1989 |
| GB | 2221089 A | 1/1990 |

*Primary Examiner* — Thienvu V Tran
*Assistant Examiner* — Shahzeb K Ahmad

(57)      ABSTRACT

A power factor correction (PFC) circuit is provided. The PFC circuit includes an input for receiving alternating current and a converter for converting the received alternating current to a direct current. The PFC circuit also includes a direct current link that includes at least one capacitor. Additionally, the PFC circuit includes a voltage regulator control loop operating in burst mode under light load conditions by switching between an ON-state and an OFF-state periodically. The PFC circuit also includes a controller preloading the voltage regulator control loop with an initial value corresponding to the circuit current load under light conditions, when the voltage regulator control loop is transitioning to an ON-state of the burst mode. The initial value is based on the rate of change of the voltage at the direct current link and the capacitance of the capacitor of the direct current link.

7 Claims, 4 Drawing Sheets

(56) References Cited

U.S. PATENT DOCUMENTS

| | | | |
|---|---|---|---|
| 2014/0369097 A1* | 12/2014 | Prescott | H02M 1/4225 |
| | | | 323/284 |
| 2018/0069471 A1* | 3/2018 | Leisten | H02M 1/4225 |
| 2022/0393574 A1* | 12/2022 | Pervaiz | H02M 3/33592 |

* cited by examiner

400

Receiving Alternating Current    402

Converting The Received Alternating Current To A Direct Current    404

When The Voltage Regulator Control Loop Transitions To An ON-state Of A Burst Mode, Preloading The Voltage Regulator Control Loop With The Initial Conditions Corresponding To Circuit Current Load Value    406

METHOD OF POWER FACTOR CORRECTION BURST MODE LOAD MEASUREMENT AND CONTROL

CROSS REFERENCE TO RELATED APPLICATIONS

This U.S. patent application claims priority under 35 U.S.C. § 119 (e) to U.S. Provisional Application 63/293,133, filed on Dec. 23, 2021, which is hereby incorporated by reference in its entirety.

TECHNICAL FIELD

The disclosure relates to a method of power factor correction (PFC) burst mode load measurement and control.

BACKGROUND

Regulatory standards such as IEC61000-3-2 for electromagnetic compatibility (EMC) require devices that draw high power from an alternating current (AC) mains (e.g., power grid) to implement power factor correction (PFC) to reduce harmonic distortion on the input current. PFC is a method of syncing AC line current phase with AC voltage to eliminate inefficiencies associated with reactive current. PFC regulates current draw from the AC mains in proportion to the AC voltage, reducing distortion of the AC sine wave under high load conditions. There are numerous methods and topologies for PFC, most of which involve a Switch Mode Power Supply (SMPS), which is an electronic power supply incorporating a switching regulator to convert electrical power efficiently.

A typical PFC circuit will convert the input AC mains to a DC output voltage stored in a bank of capacitors, commonly called DC Link. Regulation of the DC output voltage is performed by modulating the AC mains input current amplitude. Because of the requirement that the AC mains current be sinusoidally shaped and proportional to the AC mains voltage, the voltage control loop of the PFC is typically very slow as any rapid changes in the AC mains input current demanded will introduce distortion into the sinusoidal current shape. Typically, voltage regulation control loops have response times in the order of 10 times the AC mains period to reduce Total Harmonic Distortion and maintain high power factor.

Another challenge of PFC design is light load operation. When the power taken from the DC Link is very low compared to the full load condition that the PFC is designed for, a typical PFC circuit will have poor efficiency and, in some cases, poor output voltage regulation. Switching losses in the power devices and AC losses in the magnetic components remain relatively constant even at low output power, resulting in poor efficiency, and it is desirable to stop switching as much as possible during light load. Similarly, at very light loads, parasitic effects such as ringing may slowly overcharge DC Link, resulting in loss of regulation if the power stage is not periodically disabled.

SUMMARY

One aspect of the disclosure provides a power factor correction (PFC) circuit that includes an input for receiving alternating current. The PFC circuit also includes a converter for converting the received alternating current to a direct current. The PFC circuit also includes a direct current link having at least one capacitor and a voltage regulator control loop that operates in burst mode under light load conditions by switching between an ON-state and an OFF-state periodically. The PFC circuit additionally includes a controller that preloads the voltage regulator control loop with an initial value corresponding to initial conditions of the circuit current load under light load conditions when the voltage regulator control loop transitions to an ON-state of the burst mode.

Implementations of the disclosure may include one or more of the following optional features. In some implementations, the controller determines, during an OFF-state of the burst mode, the initial value based on a rate of change of the voltage at the direct current link and the capacitance C of the capacitor. In some examples, after a re-enablement of the power factor correction circuit, the input $I_{in}$ is based on the initial value corresponding to the initial conditions of the circuit current load under the light load.

In some implementations, the PFC circuit includes a pulse width modulator and a current regulator control loop that adjusts a duty cycle of the pulse width modulator based on an output current of the voltage regulator control loop.

Another aspect of the disclosure provides a method for preloading a voltage regulator control loop of a power factor correction (PFC) circuit with an initial value corresponding to initial conditions of the circuit current load under light load. The method includes receiving alternating current; and converting the received alternating current to a direct current. When the voltage regulator control loop transitions to an ON-state of a burst mode, the method includes preloading the voltage regulator control loop with the initial value corresponding to the initial conditions of the circuit current load under the light load.

In some implementations, during an OFF-state of the burst mode, the method includes determining the initial value based on a rate of change of the voltage at a direct current link and a capacitance of a capacitor of the direct current link. When the power factor correction is re-enabled, an input of the power factor correction circuit may be based on the initial value corresponding to initial conditions of the circuit current load under light load. In some examples, the method also includes adjusting, at a current regulator control loop, a duty cycle of a pulse width modulator based on an output current of the voltage regulator control loop.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
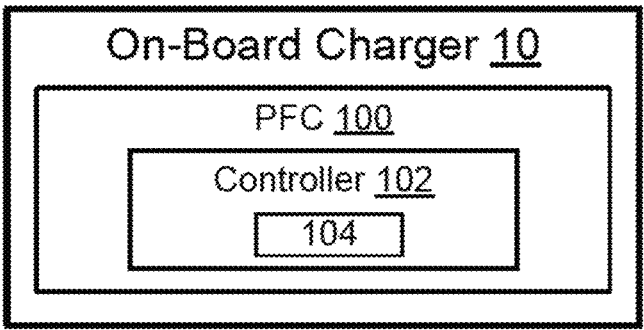
FIG. 1A is a schematic view of an exemplary on-board charger.

Referring to FIG. 1A, an on-board charger (OBC) 10 is used in electrical vehicles or hybrid vehicles to charge a battery of the vehicle. The OBC 10 converts alternating current (AC) input from the main grid to a direct current (DC) output which charges the vehicle battery. The OBC 10 may run a power factor correction (PFC) circuit 100 to transform the input AC voltage into an intermediate DC voltage, referred to as DC Link, which is used by the DC-to-DC stage to generate the charging current at the output. In some examples, the OBC 10 runs the PFC 100 in "burst mode" at light load to convert the inputted AC power from the AC main to DC power. Burst mode is a mode of operation which uses cycle-skipping to reduce switching losses in a switching regulator and increase operation efficiency at low output current levels.

Figure 1B:
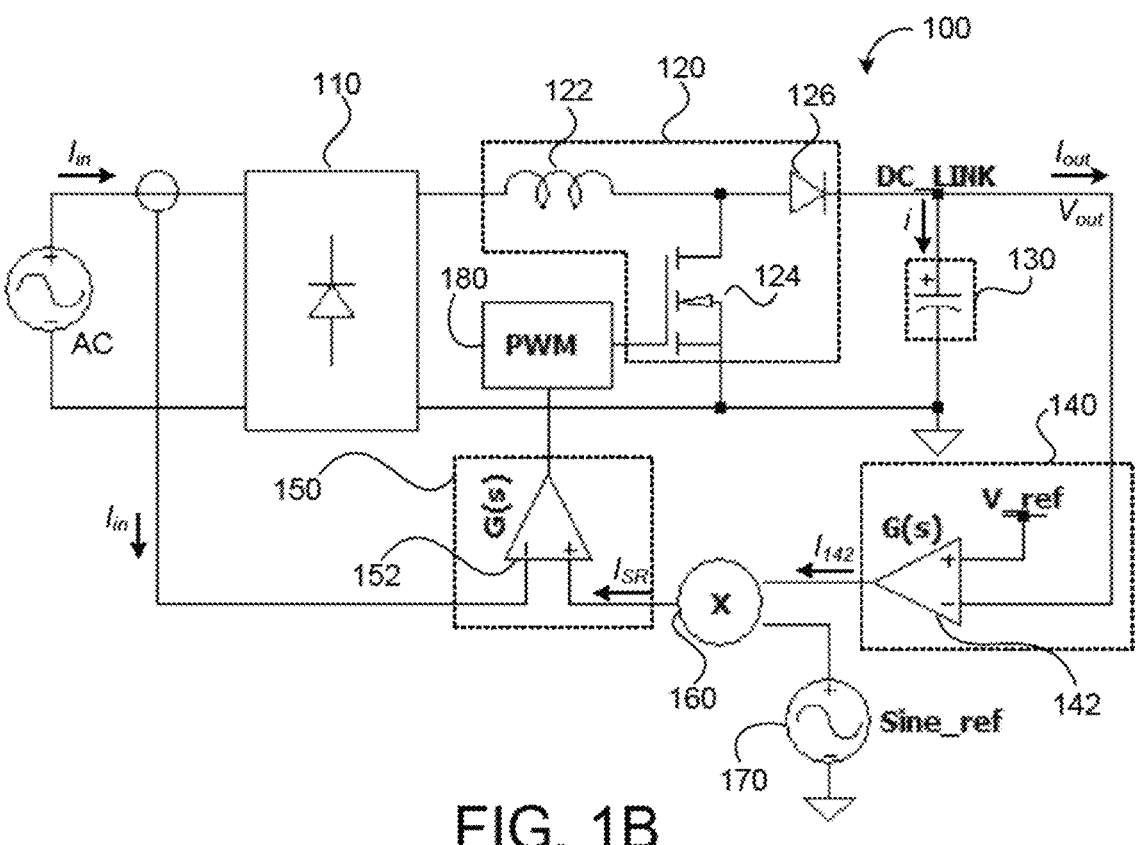
FIG. 1B is a schematic view of an exemplary power factor correction circuit of FIG. 1A.

FIG. 1B shows the PFC 100 of FIG. 1A. The PFC 100 includes controllers and measurement inputs. The PFC 100 receives power from an AC power supply from the grid that provides an input AC voltage. The received AC power supply is then rectified by a rectifier 110 having a diode bridge. Some PFC topologies may not use a rectifier. The PFC 100 also includes a switch mode power supply which is also referred to as boost converter 120. The boost converter 120 includes an inductor 122, a transistor 124, and a diode 126. Other boost converters may also be used. The boost converter 120 boosts the rectified AC voltage to the DC voltage at a DC Link and regulates the AC input current $I_{in}$. The boost converter 120 includes two states of operation. During a first state of operation, a switch of the transistor 124 is closed (i.e., the transistor 124 is ON) and the inductor 122 is charged by the voltage source coming out of the rectifier 110. During a second state of operation, when the switch of the transistor 124 opens (i.e., the transistor 124 is OFF), the energy stored in the inductor 122 during the first state is transferred to the DC Link capacitors 130 through the diode 126, resulting in an increased voltage at an output of the boost converter 120. The injected current from the diode 126 charges the capacitor 130 which maintains the voltage level at the output of the PFC 100 while the inductor 122 recharges. As shown, the capacitor 130 helps smooth an output voltage ripple from the boost converter 120. Regulation of the output voltage $V_{out}$ is accomplished by controlling (by way of a controller 102) the length of each the first and second states using pulse width modulation (PWM) 180.

Additionally, the PFC 100 includes a first control loop 140 that includes a first error amplifier 142 and a second control loop 150 that includes a second error amplifier 152. Each of the first and second control loops 140, 150 monitors and regulates the PFC 100. The first error amplifier 142 compares the voltage at the DC Link 130 against a desired reference voltage Vref (corresponds to the desired $V_{out}$). When the voltage at the DC Link 130 is below the reference voltage Vref, a current output $I_{142}$ of the first error amplifier 142 increases; when the voltage at the DC Link 130 is above the reference voltage Vref, the current output $I_{142}$ of the first error amplifier 142 decreases.

The output of the first control loop 140 is multiplied at a multiplier 160 with a reference sine wave 170 creating the sinusoidal input current reference $I_{SR}$ for the second control loop 150. The second control loop error amplifier 152 compares the input current $I_{in}$ with the reference current $I_{SR}$ and adjusts the duty cycle of the PWM 180 so that the input current $I_{in}$ matches the reference current $I_{SR}$. The amplifiers are described as transconductance amplifiers (voltage input, current output), but may be other types such as those with outputs of voltage or digital count values.

The amplitude of the current output $I_{142}$ of the first control loop 140 is roughly proportional to the amplitude of the input AC current $I_{in}$, which is in turn roughly proportional to the load current $I_{out}$ at the PFC DC Link output. At light load, the current output $I_{142}$ of the first control loop is therefore low, and when the current output $I_{142}$ falls below a predefined current threshold $I_{th}$ ($I_{142}<I_{th}$), the PFC power stage boost converter 120 is disabled and the PFC 100 enters burst mode. The PFC power stage boost converter 120 is then re-enabled when a DC Link voltage $V_{dc\_link}$ (i.e., a voltage of a bank of capacitors of the PFC circuit) falls below a predefined voltage threshold $V_{th}$ (i.e., $V_{dc\_link}<V_{th}$). The PFC 100 will then cycle between enabled and disabled modes and is active only periodically as the DC Link voltage $V_{dc\_link}$ falls below the predefined voltage threshold $V_{th}$, and turns off again when the first controller amplifier output $I_{142}$ again falls below the predetermined current threshold $I_{th}$.

The first control loop 140 must be disabled during the off part of the burst mode, otherwise the error amplifier 142 of the first control loop 140 continues to integrate the voltage error of the output voltage $V_{out}$ with respect to Vref. If the first loop 140 is not disabled during the off burst mode, then when the PFC power stage is re-enabled, the PFC 100 will run at high AC mains input current $I_{in}$ due to accumulated error at the first control loop 140, which will cause the output voltage $V_{out}$ (i.e., voltage at the DC_link) to overshoot until the first control loop 140 can recover and reduce the demand of the input current $I_{in}$. Conversely, if the first control loop 140 is disabled and reset to too low a value, upon re-enabling of the power stage, in the first control loop 140 there will be a delay to increase demand of the AC mains input current $I_{in}$ to recharge the DC Link voltage $V_{out}$.

Figure 2B:
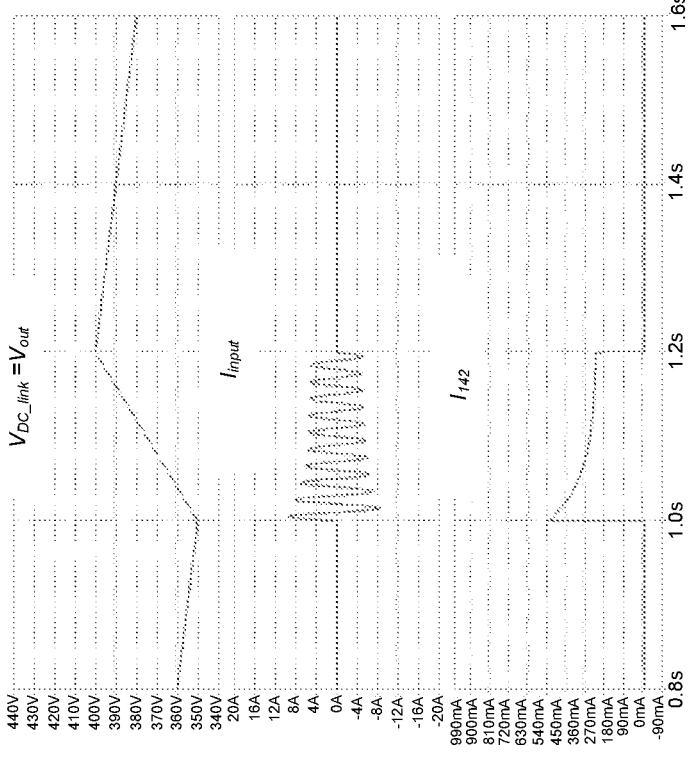
FIG. 2B is an exemplary graph showing PFC burst mode behavior with the preloading method.
Figure 2A:
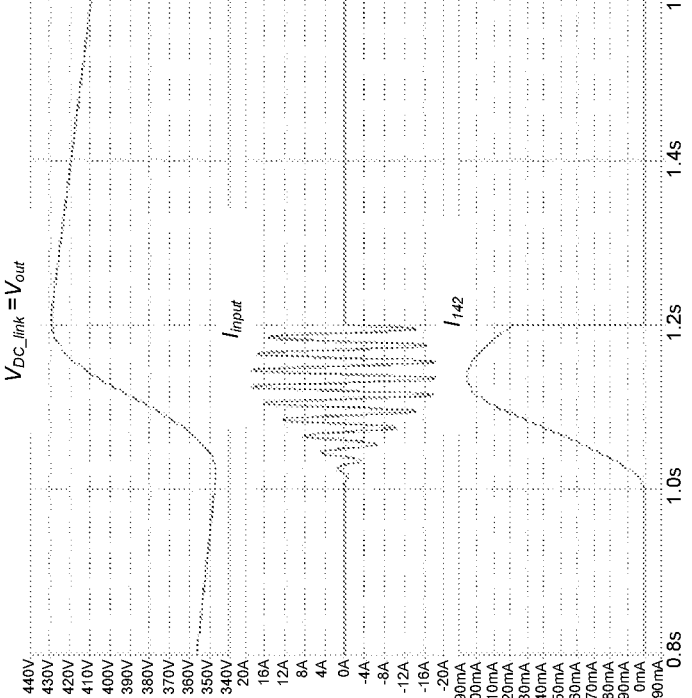
FIG. 2A is an exemplary graph showing PFC burst mode behavior without the preloading method.

Because the PFC 100 must not introduce harmonic distortion in the input AC current $I_{in}$, the first control loop 140 is very slow. The output $I_{142}$ of the first control loop 140 must not change significantly over several AC line periods so that, after being multiplied with the reference sine wave 170, the input $I_{SR}$ to the second control loop 150 remains nearly purely sinusoidal. The bandwidth of the first control loop 140 therefore is typically in the 1 to 10 Hz range. As a result, both burst mode restart strategies described in the previous paragraph would result in large deviations in the DC Link voltage $V_{DC\_link}$ (overshoot and undershoot, respectively). FIG. 2A, shows an example of the over and undershoot showing the DC Link voltage $V_{DC\_link}$ which is the PFC DC Link output voltage $V_{out}$, the PFC AC input current $I_{in}$, and the first control loop error amplifier output $I_{142}$.

Therefore, in some examples, to overcome the slow behavior of the first control loop 140, the PFC 100 "pre-loads" the first control loop 140 (with the initial value 140) so that upon re-enabling of the power stage, the ideal AC mains input current $I_{in}$ is commanded immediately by the PFC 100 and the DC Link 130 begins to recharge at the desired rate. However, the ideal AC mains input current $I_{in}$ depends on the load demand on the DC Link output $V_{out}$. Usually, this information is not available to the PFC controller 102 during the off phase of the burst mode, and would require additional sensing circuitry to implement, which increases cost.

The PFC 100 may estimate a circuit load based on a slope of discharge of the DC Link voltage $V_{DC\_link}$ at the capacitor 130. The voltage of the DC Link output $V_{DC\_link}$ is known and monitored by the PFC controller 102 at all times, including during the burst off phase. Additionally, the capacitance 130 of the DC Link is known, within some tolerance. During the burst off phase, no energy is transferred to the DC Link capacitors 130 from the disabled PFC power stage boost converter 120, so the capacitor 130 is discharged by the load current $I_{out}$ on the DC Link 130. Therefore, the relationship of the current flow (i) out of the capacitor bank 130 is equal to the product of the capacitance C of the capacitor 130 and the rate of change of the voltage (dv/dt) at the DC_link, i.e., i=C*dv/dt, Since the dv/dt discharge rate of the capacitors 130 is known by the PFC controller 102 by monitoring DC Link voltage $V_{DC\_link}$ over time, it is used to estimate the current draw from the DC Link. This information is used to determine a correct initial value 104 when re-enabling the PFC 100 power stage converter 120 during burst mode.

Figure 3:
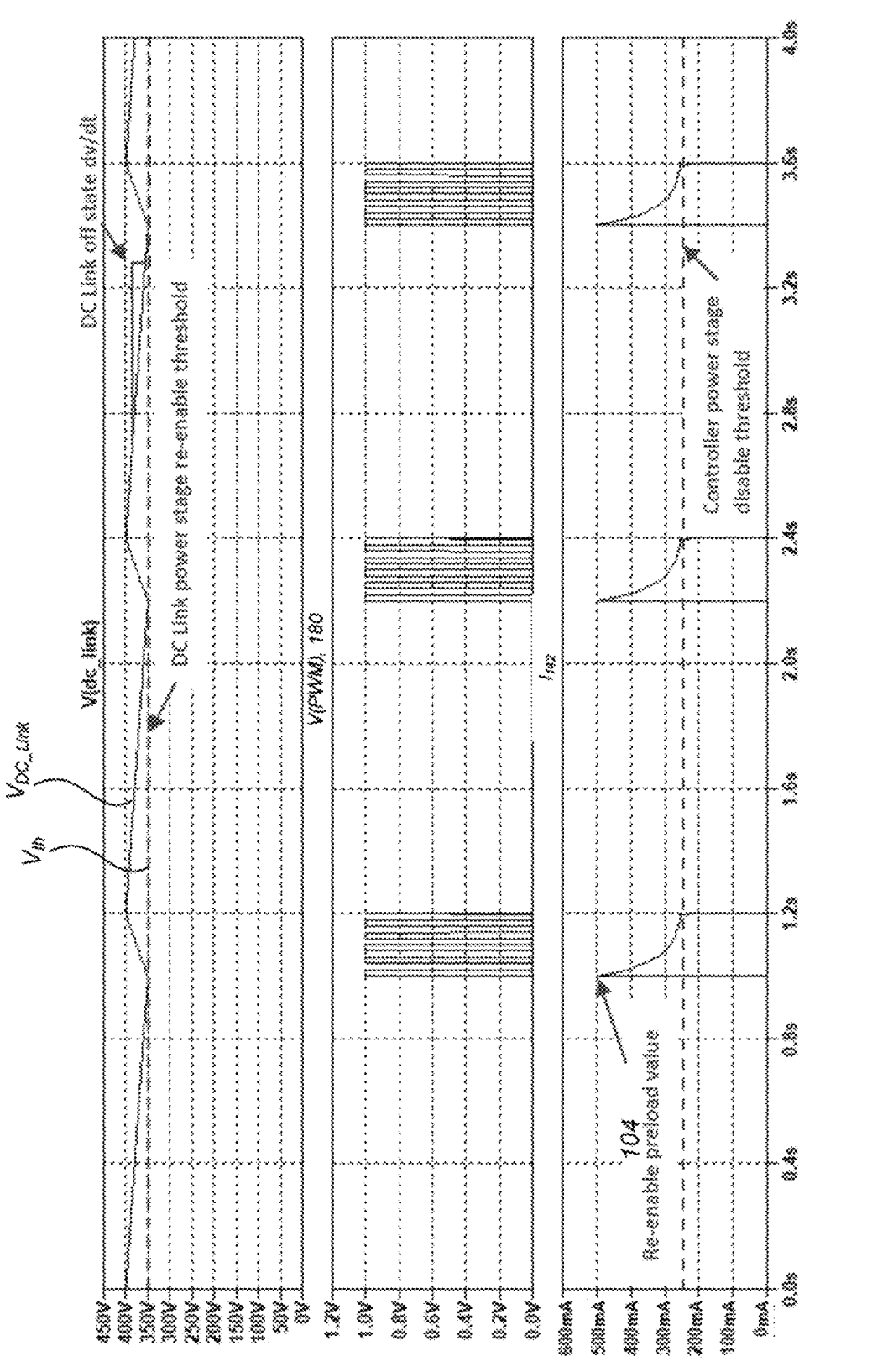
FIG. 3 is an exemplary graph showing the PFC of FIG. 1 operating in burst mode.

FIG. 3 shows the PFC 100 operating in burst mode. The PFC power stage is active when the DC Link voltage $V_{dc\_link}$ drops below a voltage threshold $V_{th}$ (i.e., $V_{dc\_link} < V_{th}$) and disabled when the first controller current output $I_{142}$ falls below a certain threshold ($I_{142} < I_{th}$). During the disabled time, the PFC controller 102 monitors the DC Link voltage $V_{dc\_link}$ so that the rate of discharge dv/dt may be determined. The load on the PFC 100 during the disabled time is not directly monitored but is proportional to the discharge rate dv/dt because of the i=C*dv/dt relationship, where the capacitance C of the capacitor 130 is assumed to be constant. $V_{DC\_Link}$ shows the voltage at the output of the PFC 100 on the DC Link capacitors 130 charging and discharging during burst on and off phases, respectively. V (PWM) shows the activation of the PFC power stage boost converter 120 during the burst on phase. The first controller amplifier output $I_{142}$ is the output of the first controller error amplifier 142, which is zero during the burst off phase, but initialized and preloaded with the initial value 104 corresponding to initial conditions of the circuit current load under light load condition at the start of the burst on phase. As described previously, the load on the PFC 100 during the disabled time is not directly monitored but is proportional to the discharge rate dv/dt because of the i=C*dv/dt relationship, where the capacitance C of the capacitor 130 is assumed to be constant.

Once the load is determined by the discharge rate dv/dt of the DC Link voltage, the appropriate initial value 104 may be determined by the PFC controller 102. The PFC controller 102 may determine the appropriate initial value 104 either by calculating or by referencing a look up table. The load determined by the discharge rate dv/dt, as well as factors such as AC mains input voltage and DC Link setpoint voltage are used to determine a initial value 104 such that upon re-enabling of the PFC power stage, the DC Link will be recharged at the appropriate $I_{in}$ for the load on DC Link so that there is no additional undershoot or overshoot, and within a target range of charging rate. The initial value 104 must also be above the threshold for entering burst mode, otherwise the PFC 100 will immediately disable the power stage again upon attempting to re-enable.

Referring back to FIG. 2B, an example of the result of the described method. $V_{DC\_link}$ is the PFC DC Link output voltage, $I_{input}$ is the PFC AC input current, and $I_{142}$ is the first control loop error amplifier 142 output. In comparison to the example of no preload shown in FIG. 2A, the DC Link output voltage undershoot and overshoot is eliminated in FIG. 2B, and peak input current is also reduced.

Figure 4:
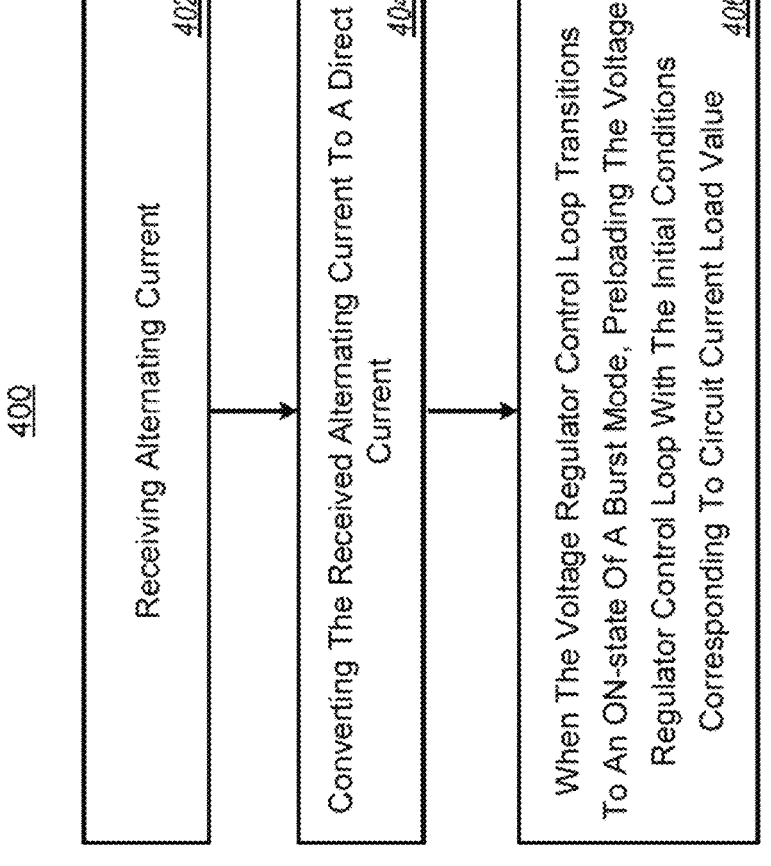
FIG. 4 is a schematic view of an exemplary arrangement of operations for a method of preloading a voltage regulator control loop of a power factor correction (PFC) circuit with initial values corresponding to initial conditions of the circuit current load under light load conditions.

FIG. 4 provides an example arrangement of operations for a method 400 of preloading a voltage regulator control loop 140 of a power factor correction (PFC) circuit 100 with an initial value 104 corresponding to initial conditions of the circuit current load under light load conditions using the system of FIGS. 1A-3. At block 402, the method 400 includes receiving, at the PFC 100, alternating current $I_{in}$ from an AC power supply supplied by the grid that provides an input AC voltage. At block 404, the method 400 includes converting, at a converter 120, the received alternating current $I_{in}$ to a direct current. method 400 may include reducing, at a boost converter 120, the direct current received from the converter 110. At block 406, the method 400 includes preloading the voltage regulator control loop 140 with the initial value 104, when the voltage regulator control loop 140 transitions to an ON-state of a burst mode.

In some implementations, the method 400 further includes determining during an OFF-state of the burst mode, the initial value 104 based on a rate of change dv/dt of the voltage at a direct current link DC_Link and a capacitance C of a capacitor 130 of the direct current link DC_Link. In some examples, the when the power factor correction is re-enabled, an input $I_{in}$ of the PFC circuit is based on the preloaded circuit current load i. The method 400 also includes adjusting, at the current regulator control loop 150, a duty cycle of a pulse width modulator 180 based on an output current of the voltage regulator control loop.

A number of implementations have been described. Nevertheless, it will be understood that various modifications may be made without departing from the spirit and scope of the disclosure. Accordingly, other implementations are within the scope of the following claims.

What is claimed is:

1. A power factor correction circuit comprising: an input for receiving alternating current; a converter for converting the received alternating current to a direct current; a direct current link comprising at least one capacitor; a voltage regulator control loop operating in burst mode under light load conditions by switching between an ON-state and an OFF-state periodically; and a controller preloading the voltage regulator control loop with preloaded initial value corresponding to initial conditions of a circuit current load under light load conditions when the voltage regulator control loop transitions to the ON-state of the burst mode, wherein during the OFF-state of the burst mode, the preloaded initial value is determined based on a rate of change of a voltage at the direct current link and a capacitance of the capacitor, and wherein when the power factor correction is re-enabled following the OFF-state, the preloaded initial value allows the PFC circuit to immediately command an Alternating Current (AC) mains input current causing the direct current link to recharge.

2. The power factor correction circuit of claim 1, wherein after a re-enablement of the power factor correction circuit following the OFF-state, the input is based on the preloaded initial value.

3. The power factor correction circuit of claim 1, further comprising:
a pulse width modulator;
a current regulator control loop adjusting a duty cycle of the pulse width modulator based on an output current of the voltage regulator control loop.

4. A method for preloading a voltage regulator control loop of a power factor correction (PFC) circuit with preloaded initial value corresponding to initial conditions of a circuit current load under light load conditions, the method comprising: receiving an alternating current; converting the received alternating current to a direct current; when the voltage regulator control loop transitions to an ON-state of a burst mode, preloading the voltage regulator control loop with the preloaded initial value corresponding to initial conditions of the circuit current load under the light load conditions, wherein during the OFF-state of the burst mode, the preloaded initial value is determined based on a rate of change of a voltage at the direct current link and a capacitance of the capacitor, and wherein when the power factor correction is re-enabled following the OFF-state, the preloaded initial value allows the PFC circuit to immediately command an ideal Alternating Current (AC) mains input current.

5. The method of claim 4, further comprising: determining, during an OFF-state of the burst mode, the preloaded initial value based on a rate of change of a voltage at a direct current link and a capacitance of a capacitor of the direct current link.

6. The method of claim 4, wherein when the power factor correction is re-enabled following the OFF-state, an input of the power factor correction circuit is based on the preloaded initial value.

7. The method of claim 4, further comprising:
   adjusting, at a current regulator control loop, a duty cycle of a pulse width modulator based on an output current of the voltage regulator control loop.

\* \* \* \* \*